United States Patent [19]

Ball et al.

[11] Patent Number: 4,748,202

[45] Date of Patent: May 31, 1988

[54] NOVEL AQUEOUS DISPERSIONS

[75] Inventors: Peter Ball, Emmerting; Richard Goetze, Mehring-Öd; Klaus Marquardt; Manfred Selig, both of Burghausen, all of Fed. Rep. of Germany

[73] Assignee: Wacker-Chemie GmbH, Fed. Rep. of Germany

[21] Appl. No.: 907,036

[22] Filed: Sep. 12, 1986

[30] Foreign Application Priority Data

Oct. 3, 1985 [DE] Fed. Rep. of Germany ....... 3535389

[51] Int. Cl.$^4$ ..................... C08L 33/00; C08L 35/00
[52] U.S. Cl. .................................. 524/823; 524/825; 524/820
[58] Field of Search .................. 524/825, 823, 820

[56] References Cited

U.S. PATENT DOCUMENTS

| 3,532,658 | 10/1970 | Gintz | 524/825 |
| 3,639,326 | 2/1972 | Kray et al. | 524/825 |
| 3,929,706 | 12/1975 | Schmidt et al. | 524/825 |
| 4,619,964 | 10/1986 | Kielbania et al. | 526/318 |

FOREIGN PATENT DOCUMENTS

| 3344242 | 6/1985 | Fed. Rep. of Germany | 524/825 |
| 57-171470 | 10/1983 | Japan | 524/825 |
| 989678 | 4/1965 | United Kingdom | 524/825 |

Primary Examiner—Joseph L. Schofer
Assistant Examiner—N. Sarofim
Attorney, Agent, or Firm—Bierman and Muserlian

[57] ABSTRACT

A process for the production of an emulsion polymerization aqueous copolymer dispersion with a solids contents of 45–55% by weight of (a) 75 to 95 parts by weight of acrylic acid and/or methacrylic acid alkyl esters of 1 to 10 carbon atoms of which 20 to 80% by weight have a water solubility of at most 2 g/l and 20 to 80% by weight a water solubility of at least 10 g/l (b) 5 to 25 parts by weight of a mixture of ethylenically-unsaturated, functional and water-soluble monomers, 25 to 100% by weight thereof consisting of unsaturated carboxylic acids.

(c) 500 to 1700 parts by weight of a mixture of 70 to 100% by weight of vinyl chloride, 0 to 30% by weight of at least one vinyl ester of saturated carboxylic acids of 2 to 18 carbon atoms and 0 to 1.5% by weight of a poly-unsaturated monomer which possesses a water solubility of at most 5 g/l, and (d) Ethylene with radical initiators in the presence of emulsifiers and optionally other common additives, characterized in that (1) the components (a) and (b) together with 500 to 1000 parts by weight of water and 0.5 to 10 parts by weight of emulsifier are charged at a pH value of 2 to 4 in an autoclave, and their polymerization is begun at a temperature of 50° to 80° C. by addition of an initiator, (2) the component (c) is metered in in the form of an aqueous emulsion as soon as components (a) and (b) are reacted at least 50% and at most 99%, (3) during the metering phase a pH value of 4.5 to 6.5 is maintained, (4) an ethylene pressure of 40 to 80 bars is built up at the time indicated in (2) and (5) before start of polymerization or at the latest at the time indicated in (2) 10 to 50 parts of an inert organic substance having a water solubility of $10^{-3}$ to 200 g/l and a molecular weight of at most 1000 are added.

8 Claims, No Drawings

NOVEL AQUEOUS DISPERSIONS

STATE OF THE ART

Aqueous copolymer dispersions with a predominant content of vinyl chloride and ethylene are suitable as binders for paints and improved, especially profitable methods for their production have been described in the European Pat. No. 76,511 and No. 124,759. However, plasters and paints, particularly those with a high percentage of filler, must meet special requirements, particularly with respect to their adhesivity on the substrate, their resistance to fissuration and their abrasion resistance. In a first preliminary test in which dispersion films applied on glass plates are stored in water, a large part of such dispersions can already be eliminated as not satisfactory for the above purpose. Insufficient resistance manifests itself in strong white blushing and rapid detachment from a glass plate. Moreover, many other dispersions fail in additional application technological testing e.g. with respect to pigment binding capacity, abrasion resistance and resistance to cracking.

OBJECTS OF THE INVENTION

It is an object of the invention to provide such aqueous copolymer dispersions purposefully with a predominant content of vinyl chloride (VC) and ethylene (E) which fulfill the above quality criteria for paints and plasters, but which excel especially by improved properties and therefore are especially well suited for the production of high-grade coating materials and coatings.

This and other objects and advantages of the invention will become obvious from the following detailed description.

THE INVENTION

The novel process of the invention for the production of an emulsion polymerization aqueous copolymer dispersion with a solids contents of 45-55% by weight of
(a) 75 to 95 parts by weight of acrylic acid and/or methacrylic acid esters with alkyl groups having 1 to 10 carbon atoms of which 20 to 80% by weight have a water solubility of at most 2 g/l and 20 to 80% by weight a water solubility of at least 10 g/l.
(b) 5 to 25 parts by weight of a mixture of ethylene-unsaturated, functional and water-soluble monomers, 25 to 100% by weight thereof consisting of unsaturated carboxylic acid,
(c) 500 to 1700 parts by weight of a mixture of 70 to 100% by weight of vinyl chloride, 0 to 30% by weight of at least one vinyl ester of saturated carboxylic acids of 2 to 18 carbon atoms and 0 to 1.5% by weight of a poly-unsaturated monomer which possesses a water solubility of at most 5 g/l, and
(d) Ethylene with radical initiators in the presence of emulsifiers and optionally other common additives, is characterized in that (1) the components (a) and (b) together with 500 to 1000 parts by weight of water and 0.5 to 10 parts by weight of emulsifier are charged at a pH value of 2 to 4 in an autoclave, and their polymerization is begun at a temperature of 50° to 80° C. by addition of an initiator, (2) the component (c) is metered in in the form of an aqueous emulsion as soon as components (a) and (b) are reacted at least 50% and at most 99%, (3) during the metering phase a pH value of 4.5 to 6.5 is maintained, (4) an ethylene pressure of 40 to 80 bars is built up at the time (moment) indicated in (2) and (5) before the start of polymerization or at the latest at the time (moment) indicated in (2) 10 to 50 parts of an inert organic substance having a water solubility of $10^{-3}$ to 200 g/l and a molecular weight of at most 1000 are added.

In the process of the invention, the functional monomers indicated under (b) are incorporated into the rest of the polymer so favorably that the binder properties necessary for the production of high-grade coatings are obtained. At the same time, it is possible to incorporate the desired amounts of ethylene already at relatively low pressure and with short reaction time.

In the following, a specific and therefore preferred form of realization of the process is described in further detail in which the monomers (b), 500 to 1000, preferably 600 to 700 parts by weight of deionized water, 0.5 to 10, preferably 1 to 5, parts by weight of a preferably anionic emulsifier or emulsifier mixture and optionally further additives customary in emulsion polymerization such as buffers, regulators and inhibitors are mixed and the pH value is adjusted into the range of 2 to 4, preferably 2.7 to 3.5. The pH adjustment is preferably effected with volatile acids or bases such as formic acid or ammonia. After addition of the monomers under (a) and adjustment of the polymerization temperature to 50° to 80°, preferably 65° to 75° C., the polymerization is initiated by addition of an initiator. The rate of radical formation of the initiator should preferably be adjusted so that the content of double bonds in the charge, observable by bromometric titration, will have decreased to 5% of the starting value within 30 to 45 minutes after start of reaction (=95% conversion).

As soon as the monomers (a) and (b) have reacted 50 to 99%, preferably 85 to 95%, an ethylene pressure between 40 and 80 bars, preferably 55 to 70 bars, is obtained and addition of the pre-emulsion described under (c) is begun. The rate of addition is adjusted so that the ethylene pressure does not rise spontaneously, but remains constant or decreases slightly. If desired, the pressure may be stabilized during the reaction time by forcing in more ethylene, but it is also possible to increase the pressure purposefully by additional pumping, or to let it drop, e.g. by draining. Preferably the pressure is maintained constant during the addition of the components (c) and letting it drop thereafter by shutting off the ethylene supply.

After complete addition of the components (c), the supply of initiator and hence the formation of radicals is maintained until the charged quantity of vinyl chloride is more than 99% reacted. Thereafter, the pH of the dispersion is adjusted to values between 7 and 10, preferably 7.5 to 8.5 and any still existing overpressure expanded, the dispersion degassed by applying a vacuum and then cooled.

For components (a) to (c), one or more of the examples named in the following can be employed:

As components of mixture (a), the esters of acrylic acid and of methacrylic acid with straight-chain or branched aliphatic alcohols of 1 to 10 carbon atoms are suitable. A table of the water solubility of these esters is found in "Vinyl and Diene Monomers, Part 1", E. C. Leonard Ed., Wiley-Interscience, New York (1970) p. 149 ff.

Suitable esters of acrylic acid and methacrylic acid with a water solubility less than 2 g/l are e.g. butyl acrylate, ethylhexyl acrylate, ethyl methacrylate or butyl methacrylate; preferably butyl acrylate, butyl methacrylate and/or ethylhexyl acrylate. Suitable esters with a water solubility over 10 g/l are e.g. methyl acrylate, ethyl acrylate and/or methyl methacrylate; especially preferred are ethyl acrylate and/or methyl methacrylate.

Suitable components of mixture (b) are acrylic acid, methacrylic acid, itaconic acid, fumaric acid and maleic acid, their alkali metal and ammonium salts, their mono- and diamides which may be mono- or di-substituted on the nitrogen by methylol, monoesters of the said dicarboxylic acids with alkanols of 1 to 3 carbon atoms, vinyl sulfonates, and esters substituted with sulfonate groups, and/or amides of unsaturated carboxylic acids, styrenes substituted with sulfate groups, N-vinyl pyrrolidone, hexyl substituted esters of unsaturated carboxylic acids. Preferred water-soluble monomers are acrylic acid, methacrylic acid, their alkali metal and ammonium salts, acrylamide, methacrylamide, N-methylol acrylamide, N-methylol-methacrylamide, vinyl sulfonate, hydroxyethyl(meth)acrylate, sulfate substituted esters and/or amides of (meth)acrylic acid such as sulfoethyl(meth)acrylate or sulfopropyl(meth)acrylate. Especially preferred are acrylic acid, methacrylic acid and acrylamide.

Suitable vinyl esters in mixture (c) are vinyl acetate, vinyl propionate, vinyl butyrate, vinyl-2-ethyl hexanoate, vinyl laurate and vinyl esters of Versatic ® acids. Preferred are vinyl esters of Versatic ® acid of 10 carbon atoms in the acid radical and vinyl laurate.

Suitable poly-unsaturated monomers with a water solubility less than 5 g/l are vinyl and allyl esters of saturated and unsaturated dicarboxylic acids of 4 to 10 carbon atoms and di- and polyesters of α,β unsaturated carboxylic acids with polyfunctional alcohols. Especially preferred is divinyl adipate. Crosslinking agents with hydrophilic properties are clearly less suitable and are therefore preferably not used in component (c).

Suitable inert substances which have already been discussed in European patent application No. 76,511 and are added before or during the polymerization of the mixture (a) and (b) are the compounds of the following groups 1 to 5 which can be employed singly or as mixtures. Preference is given to the compounds of group 1.

1. Esters, partial esters and polyesters of mono- or poly-basic organic acids (1 to 20, preferably 2 to 8 carbon atoms per acid molecule) with mono- or polyvalent alcohols (1 to 20, preferably 2 to 8 carbon atoms per alcohol molecule), the carbon atom chain of which may be interrupted in the acid as well as in the alcohol moiety by up to 3 oxygen atoms (ether bond) or may be substituted by epoxy, alkoxy of 1 to 8 carbon atoms, phenoxy and/or hydroxy.

Examples of suitable acids for the formation of such esters are: Formic acid, acetic acid, propionic acid, butyric acid, valeric acid, capronic acid, caprylic acid, caprinic acid, ethylbutyric acid or ethylhexanic acid, pelargonic acid, lauric acid or benzoic acid, oxalic acid, malonic acid, succinic acid, glutaric acid, adipic acid, sebacic acid, phthalic acid, hexahydrophthalic acid, trimellitic acid, glycolic acid, citric acid, tartaric acid, lactic acid or ricinoleic acid or their alkoxy derivatives, epoxidized soy fatty acid, epoxystearic acid.

Examples of alcohols suitable for esterification with the said acids are: methanol, ethanol, propanols, butanols, pentanols, hexanols, heptanols or octanols, cyclohexanol, benzyl alcohol, ethylene glycol, diethylene glycol, triethylene glycol, propanediol, butanediol, and hexanediol, trimethylol propane, pentaerythritol, glycerol, methylglycol, ethylglycol and butyl glycol or diglycol, phenylglycol, glycidol.

Examples of especially preferred esters are: Butyl(di)glycol acetate, diethylene glycol dibenzoate, triethylene glycol dibenzoate, triethylene glycol diethylbutyrate, dibutyl phthalate, diethylhexyl phthalate (dioctyl phthalate), dibutyl adipate, dioctyl adipate, dimethylglycol phthalate, butylphthalylbutyl glycolate, methyl and ethyl phthalylethyl glycolate, diethoxyethyl adipate, dibutoxyethyl adipate and phthalate, oligo esters from triethylene glycol and adipic acid, 2,2,4-trimethylpentanediol-1,3-monoisobutyrate, butylbenzyl phthalate and butylcresyl phthalate.

2. Esters of phosphoric acid with optionally substituted phenols and/or with mono-valent alcohols (1 to 20, preferably 2 to 8 carbon atoms per alcohol molecule), whose carbon atom chain may be interrupted by up to 3 oxygen atoms or substituted by alkoxy of 1 to 8 carbon atoms or chlorine. Examples of suitable and preferred esters are: trioctyl phosphate, trichloroethyl phosphate, tributyl phosphate, tributylglycol phosphate, cresyldiphenyl phosphate, triphenyl phosphate.

3. Ethers and acetals of 4 to 20 carbon atoms per molecule whose carbon atom chain may be interrupted by 1 to 3 oxygen atoms or substituted by alkoxy of 1 to 8 carbon atoms or phenoxy. Examples of suitable ethers and acetals are e.g. dibutyl ether, dibenzyl ether or dibutoxyethoxyethyl formal. Preferred is for example diphenoxyethyl formal.

4. Chloro- and fluorohydrocarbons of 1 to 20 carbon atoms per molecule whose carbon atoms may be substituted with up to 2 chlorines such as methylene chloride, dichloroethane, 1,1,3-trichloro-1,2,2-trifluoroethane, chlorobenzene, chlorodiphenyls. Preferred from among this group is methylene chloride.

5. Aromatic hydrocarbons of 5 to 20 carbon atoms per molecule such as e.g. benzene, toluene, xylene, preferably toluene.

Suitable emulsifiers are non-ionic or anionic surfactants such as (1) Alkyl sulfate, especially those with a chain length of 8 to 18 carbon atoms, alkyl and alkylaryl ether sulfates with 8 to 18 carbon atoms in the hydrophobic radical and 1 to 40 ethylene or propylene oxide units.

(2) Sulfonates, especially alkyl sulfonates of 8 to 18 carbon atoms, alkylaryl sulfonates of 8 to 18 carbon atoms, taurides, esters and semi-esters of sulfosuccinic acid with monovalent alcohols or alkyl phenols of 4 to 15 carbon atoms in the alkyl radical. Optionally, these alcohols or alkyl phenols may be ethoxylated with 1 to 40 ethylene oxide (EO) units.

(3) Phosphoric acid partial esters and their alkali metal and ammonium salts, especially alkyl or alkylaryl phosphates of 8 to 20 carbon atoms in the organic radical, alkyl ether or alkylaryl ether phosphates of 8 to 20 carbon atoms in the alkyl or alkylaryl and 1 to 40 ethyleneoxide units.

(4) Alkylpolyglycol ethers preferably of 8 to 40 ethyleneoxide units and alkyl of 8 to 20 carbon atoms.

(5) Alkylaryl polyglycol ethers preferably of 8 to 40 ethyleneoxide units and 8 to 20 carbon atoms in the alkyl and aryl.

(6) Ethylene oxide/propylene oxide (EO/PO) block copolymers preferably with 8 to 40 ethyleneoxide or respectively propyleneoxide.

Preferred anionic emulsifiers in the polymerization of the mixture (a) and (b) are the members of groups 1 and 2 with less than 10 ethylene oxide units, the ethoxy group-free emulsifiers being especially preferred. Preferred emulsifiers in the polymerization during and after the addition of mixture (c) are are the ethoxylated members of groups 1 to 3 and groups 4 and 5. Especially preferred are the ethoxylated members of group 1.

The polymerization is initiated by the methods normally used for emulsion polymerization. Especially suitable are at least partially water-soluble, preferably totally water-soluble inorganic or organic peroxidic compounds such as peroxo compounds, hydroperoxides and per esters as well as water-soluble azo compounds. Examples are alkali metal and ammonium peroxosulfates, peroxodisulfates and peroxophosphates, hydrogen peroxide, tertiary butyl hydroperoxide, azo-biscyanovalerianic acid and tertiary butyl permaleinate.

Optionally, the said peroxide initiators may also be combined with reducing agents in a known manner. Suitable are e.g. alkali metal formaldehyde sulfoxylates (Brüggolith ®, Rongalit ®), alkali metal bisulfites, sulfites, thiosulfates and ascorbic acid. Also, the known addition of small amounts of heavy metal compounds such as iron-II-salts is often indicated. Especially preferred is the thermal polymerization with alkali metal or ammonium peroxo(di)sulfates.

For emulsion polymerization, there may be added further customary adjuvants such as buffering agents, regulators or inhibitors against premature polymerization.

According to the invention, dispersions are obtained whose polymers have preferably the following composition; in each instance up to 82, more particularly 63 to 77, % by weight of vinyl chloride units 25, more particularly 14 to 20, % by weight of ethylene units 25, more particularly 2 to 5, % by weight of vinyl ester units 15, more particularly 6 to 10, % by weight of (meth-)acrylic acid ester units (component a)

4, more particularly 1 to 1.5, % by weight units of the functional and water-soluble monomers (component b)

1.2, more particularly 1 to 0.5, % by weight units of poly-unsaturated monomers.

In this connection it is striking that the monomers, except ethylene, are always incorporated in the polymers practically completely. The dispersions produced by the invention are suitable for the production of plastic-bound plasters of good water resistance and of indoor and outdoor paints of good abrasion resistance. The paints, in particular for the indoor sector, may also be highly filled.

In the following examples there are described several preferred embodiments to illustrate the invention. However, it should be understood that the invention is not intended to be limited to the specific embodiments.

EXAMPLE 1

3,655 ml of deionized water, 231 g of a 15% aqueous Na-dodecyl-benzenesulfonate solution, 116 g of a 30% aqueous acrylamide solution and 69 g of methacrylic acid were mixed in a 16-liter stirred autoclave and the pH of the mixture was adjusted with dilute ammonia to 3.5. This was followed by evacuation, flushing with nitrogen, again evacuating, and then a mixture of 347 g of butyl acrylate, 347 of methylmethacrylate and 231 g of a dibutyl ester mixture of dicarboxylic acids of 4 to 6 carbon atoms [Lusolvan FBH ®, BASF AG, Ludwigshafen (DE)] was pumped in, which mixture had previously been stabilized against premature polymerization by addition of 146 mg of benzoquinone. After heating to 70° C., 185 ml of a 10% aqueous ammonium persulfate solution were added over 3 minutes and, 45 minutes later, the charged monomers were 97% reacted. At that time, 70 bars of ethylene were pumped in and simultaneously there was begun the metering of 10% aqueous ammonium persulfate solution at 29 ml/h and a pre-emulsion of 2,617 ml of water, 832 g of a 35% aqueous solution of a nonylphenolpolyethylene oxide sulfate (from about 25 mol ethylene oxide per mol of emulsifier), 5,950 of vinyl chloride and 29.7 g of divinyl adipate at a rate of 1750 ml/h. During this proportioning, the pH was maintained between 5.1 and 5.6 by addition of ammonia and the ethylene pressure was kept at 70 bars. After completion of the pre-emulsion metering, the initiator and ethylene metering was adjusted and the reactor content was kept at 70° C. for another hour. During this time, pH was adjusted to 8.5 by addition of ammonia. Then, the ethylene pressure was removed and the dispersion was stirred in vacuum for one hour.

Analyses showed an ethylene content of 17%, a solids content of 48.8%, and a viscosity (Brookfield viscosimeter, 20° C., 20 rpm) of 390 mPa.s. The particle diameter, determined by electron microscope, was 0.09 μm. The product showed a K value [DIN 53,726 measured in THF/H₂O 95:5] of 54.8 and a minimum film-forming temperature of 27° C.

EXAMPLE 2

In the formulation of Example 1, the methacrylic acid was replaced by acrylic acid in the aqueous change, a pH of 3 was adjusted, and instead of 5,950 g of vinyl chloride a mixture of 5,658 g of vinyl chloride and 293 g of vinyl laurate was used. The addition of ethylene and the start of the pre-emulsion and initiator metering occurred 30 minutes from the start of reaction at a conversion of 90%. The product showed the following analytical data:

| Ethylene content: | 17.3% | Solids content: | 48.7% |
|---|---|---|---|
| Viscosity: | 230 mPa · s | Particle size: | 0.09 μm |
| K value: | 57.3 | Min. Film-forming temperature: | 15° C. |

EXAMPLE 3

The procedure of Example 1 was repeated with the following formulation: (a) Aqueous charge: 4,046 g of Water, 231 g of 15% Na-dodenylbenzene sulfonate solution, 83 g of methacrylic acid and 139 g of 30% acrylamide solution; (b) Monomer charge mixture: 347 g of Butyl acrylate, 347 g of Methyl methacrylate, 231 g of Lusolvan ® 0.7 g of Mercaptopropionic acid (as regulator) and 146 mg of Benzoquinone; (c) Pre-emulsion dosage mixture: 2,230 g of Water, 832 g of 35% nonylphenolpolyethylene oxide sulfate solution, 5,655 g of vinyl chloride and 292 g of vinyl laurate. At a solids content of 49.6%, the viscosity was 7960 mPa.s and the remaining analytical data were as in Example 2.

EXAMPLE 4

Example 1 was repeated with the following modifications: In the monomer charge, butyl acrylate was replaced by ethylhexyl acrylate, and in the monomer dosage, vinyl laurate was replaced by vinyl versatate (ester of Versatic ® acids with approx. 10 carbon atoms in the acid radical). The addition of ethylene and pre-emulsion began at 93% conversion of the components (a) and (b) and the analytical data of the copolymer dispersion:

| Ethylene content: | 20.8% | Solids content: | 48.4% |
|---|---|---|---|
| Viscosity: | 400 mPa · s | Particle size: | 0.1 μm |
| K value: | 43 | Min. film-forming temp: | 16° C. |

COMPARISON EXAMPLE A

Example 4 was repeated using only butyl acrylate instead of the mixture of methyl methacrylate and ethylhexyl acrylate and the batch coagulated during removal of ethylene pressure.

COMPARISON EXAMPLE B

Example 4 was repeated using only methyl methacrylate instead of the mixture of methyl methacrylate and ethylhexyl acrylate. Analytical data of the dispersion:

| ethylene content: | 24% | Solids content: | 46% |
|---|---|---|---|
| Viscosity: | 280 mPa · s | Particular size: | 0.1 μm |
| K value: | 41 | Min. film-forming temperature: | 14° C. |

COMPARISON EXAMPLE C

Example 10 from EP-A-76 511 was repeated and Analytical data of the dispersion was as follows:

| Ethylene content: | 17% | Solids content: | 50.1% |
|---|---|---|---|
| Viscosity: | 39 mPa · s | Particle size: | 0.1 μm |
| K value: | 35 | Min. film-forming temperature | 23° C. |

B. Application Technological Tests

Water absorption test

For testing the water absorption, air-dried dispersion film pieces measuring 5 cm × 5 cm and with a thickness of 0.2 to 0.4 mm were stored for 3 hours at 50° C., cooled over calcium chloride in a desiccator, and weighed. Then they were stored for 24 hours in water at 23° C. Thereafter, the film pieces were dabbed with a chamois and weighed again. The water absorption was evident from the increase in weight referred to the initial weight.

White blush

A dispersion film was applied on a black glass plate with a 0.2 mm wire spreader and was dried for 2 hours at 50° C. The glass plate was then placed half way in water at 23° C. watching when the dispersion film reached a whitish haze defined through a reference gray scale. In the same experiment, it was observed whether and after what time, the film detaches from the glass plate.

Fissuration

Paints were prepared with the dispersion to be tested according to a test formulation with a conventional pigment/filler mixture of a pigment volume concentration (PVC) of 56 and 58% (volume parts pigment per volume parts total). The minimum film-forming temperature was normalized at 0° C. by adding empirically determined quantities of butyl diglycol acetate. The paints were applied as a wedge layer in a maximum wet thickness of 1 mm on chip boards as absorbent substrate and dried for 48 hours in standard reference atmosphere. Any resulting cracks were evaluated by ISO 4628 Part 4—1982 on a scale from 0 (no cracks) to 5 (many strong cracks).

Resistance to washing and scouring

For testing the resistance to washing and scouring according to DIN* 53778, Part 2, a high-filler standard indoor paint of a pigment volume concentration of 80 and 83.3% respectively, was prepared with the dispersions to be examined. The minimum film-forming temperature was normalized at 0° C. by addition of empirically determined quantities of butyl diglycol acetate. The test was carried out 7 and 28 days, respectively, after application of the paint.

*DIN means German Industrial Standard

The results of the application technological analysis are compiled in the following table.

| | Application technological paramaters for Example 1–5 and comparison examples B and C | | | | | | | |
|---|---|---|---|---|---|---|---|---|
| | Water absorption after 24 h | Blooming | Detachment from glass plate | Fissuration | | Washing and scouring resistance (Scouring cycles) | | |
| Example | (%) | (h) | (h) | PVC 56 | PVC 58 | PVC | Stored 7 days | Stored 28 days |
| | | | | (Rating) | | | | |
| 1 | 15.0 | 3 | 3 | 0 | 2 | 80 | 1150 | 2063 |
| 2 | 8.9 | 1.5 | >24 | 0 | 0–1 | 80 | 900 | 1380 |
| 3 | 6.9 | 2.5 | 20 | 0–1 | 1 | 80 | 572 | |
| 4 | 10.9 | >6 | >24 | 0 | 0 | 83.3 | 370 | 1150 |
| 5 | 7.7 | >6 | >24 | 0 | 0 | 80 | 1950 | |
| Comparison B | 50.3 | 0.08 | 2 | 2 | 2 | 83.3 | 127 | 390 |
| Comparison C | 9.0 | 2.0 | >24 | 5 | 5 | 83.3 | 42 | — |

Various modifications of the products and process of the invention may be made without departing from the spirit or scope thereof and it is to be understood that the invention is intended to be limited only as defined in the appended claims.

What we claim is:

1. A batch process for the production of an emulsion polymerization aqueous copolymer dispersion with a solids contents of 45–55% by weight consisting essentially of
   (a) 75 to 95 parts by weight of acrylic acid and/or methacrylic acid alkyl esters of 1 to 10 carbon atoms of which 20 to 80% by weight have a water solubility of at most 2 g/l and 20 to 80% by weight a water solubility of at least 10 g/l.
   (b) 5 to 25 parts by weight of a mixture of ethylenically-unsaturated, functional and water-soluble monomers, 25 to 100% by weight thereof consisting of unsaturated carboxylic acids.

(c) 500 to 1700 parts by weight of a mixture of 70 to 100% by weight of vinyl chloride, 0 to 30% by weight of at least one vinyl ester of saturated carboxylic acids of 2 to 18 carbon atoms and 0 to 1.5% by weight of a poly-unsaturated monomer which possesses a water solubility of at most 5 g/l, and (d) ethylene with radical initiators in the presence of emulsifiers and other common additives, characterized in that (1) the components (a) and (b) together with 500 to 1000 parts by weight of water and 0.5 to 10 parts by weight of emulsifier are charged at a pH value of 2 to 4 in an autoclave, and the polymerization is begun at a temperature of 50° to 80° C. by addition of an initiator, (2) the component (c) is metered in in the form of an aqueous emulsion as soon as components (a) and (b) are reacted at least 50% and at most 99%, (3) during the metering phase a pH value of 4.5 to 6.5 is maintained, (4) an ethylene pressure of 40 to 80 bars is built up at the time indicated in (2) and (5) before start of polymerization or at the latest at the time indicated in (2) 10 to 50 parts of an inert organic substance having a water solubility of $10^{-3}$ to 200 g/l and a molecular weight of at most 1000 are added.

2. The process of claim 1 wherein the pre-emulsion formed from component (c) is proportioned so that the ethylene pressure in the reaction vessel does not increase spontaneously.

3. The process of claim 1 wherein there are used as less water-soluble esters of component (a) butyl(meth)acrylate and/or ethylhexyl acrylate and as more strongly water-soluble esters of component (a) ethyl acrylate and/or methyl methacrylate.

4. The process of claim 1 wherein component (b) is at least one member of the group consisting of acrylic acid, methacrylic acid and acrylamide.

5. The process of claim 1 wherein the vinyl esters of component (c) are at least one member selected from the group consisting of vinyl laurate and vinyl esters of tertiary carboxylic acids of 9 to 11 carbon atoms.

6. The process of claim 1 wherein the inert organic substances are at least one member of the group consisting of esters, partial esters and polyesters of mono- and/or poly-basic organic acids with 1 to 20 carbon atoms in the acid.

7. The process of claim 1 wherein divinyl adipate is the poly-unsaturated monomer in component (c).

8. A paint or plastic bound plaster containing an aqueous copolymer dispersion produced by the process of claim 1.

* * * * *